March 26, 1940.  P. B. HUMPHREY  2,194,752
MOWER
Filed July 19, 1939   3 Sheets-Sheet 1

Inventor
P. B. Humphrey

By Clarence A. O'Brien
and Hyman Berman
Attorneys

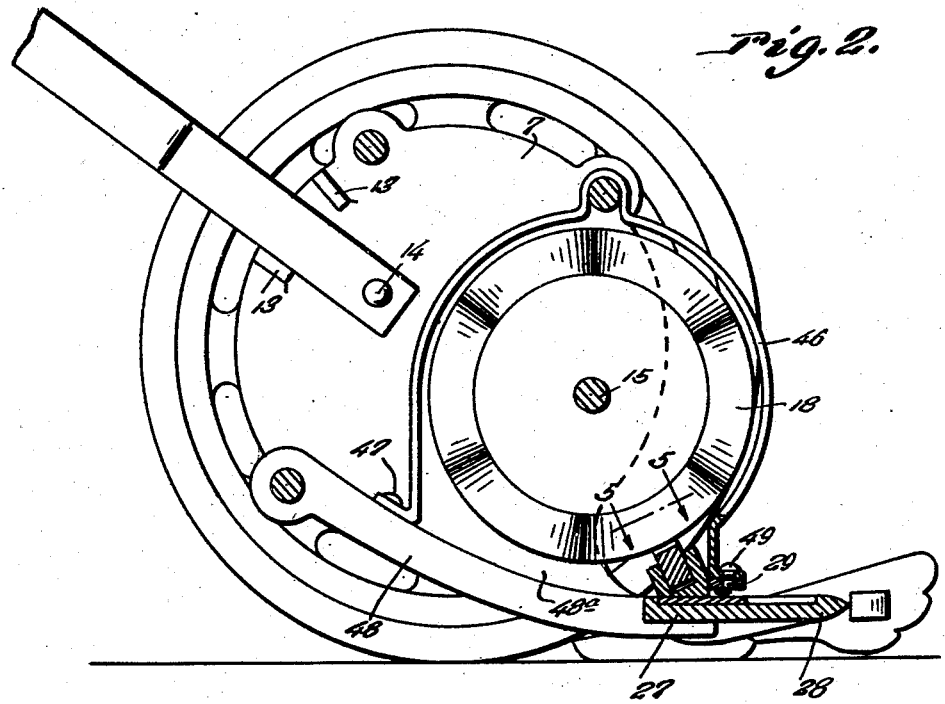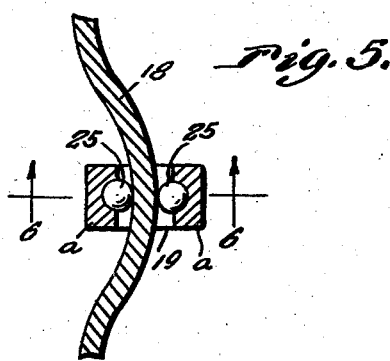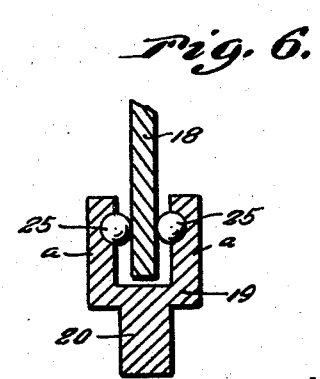

March 26, 1940.  P. B. HUMPHREY  2,194,752
MOWER
Filed July 19, 1939  3 Sheets-Sheet 3

Inventor
P. B. Humphrey
By Clarence A. O'Brien
and Hyman Berman
Attorneys

Patented Mar. 26, 1940

2,194,752

UNITED STATES PATENT OFFICE 2,194,752

MOWER

Pius B. Humphrey, La Plata, Mo., assignor of one-third to Byron White, Jr., Neodesha, Kans., and one-third to Mamie Humphrey, La Plata, Mo.

Application July 19, 1939, Serial No. 285,431

3 Claims. (Cl. 56—262)

This invention appertains to new and useful improvements in mowers such as are used for mowing grass and more particularly to a mower of the reciprocating sickle type.

The principal object of the present invention is to provide a mower which will cut growths which could not be cut by the usual revolving blade-type of mower now in general use.

Another important object of the invention is to provide a mower which can be readily adjusted and wherein the parts are so constructed and arranged as to permit ready repair and replacement of parts.

Other objects and advantages of the invention will become apparent to the reader of the following specification.

In the drawings:

Figure 2 is a section on the line 2—2 of Figure 1.

Figure 5 is a fragmentary detailed sectional view on the line 5—5 of Figure 2.

Figure 6 is a fragmentary detailed sectional view on the line 6—6 of Figure 5.

Figure 1:
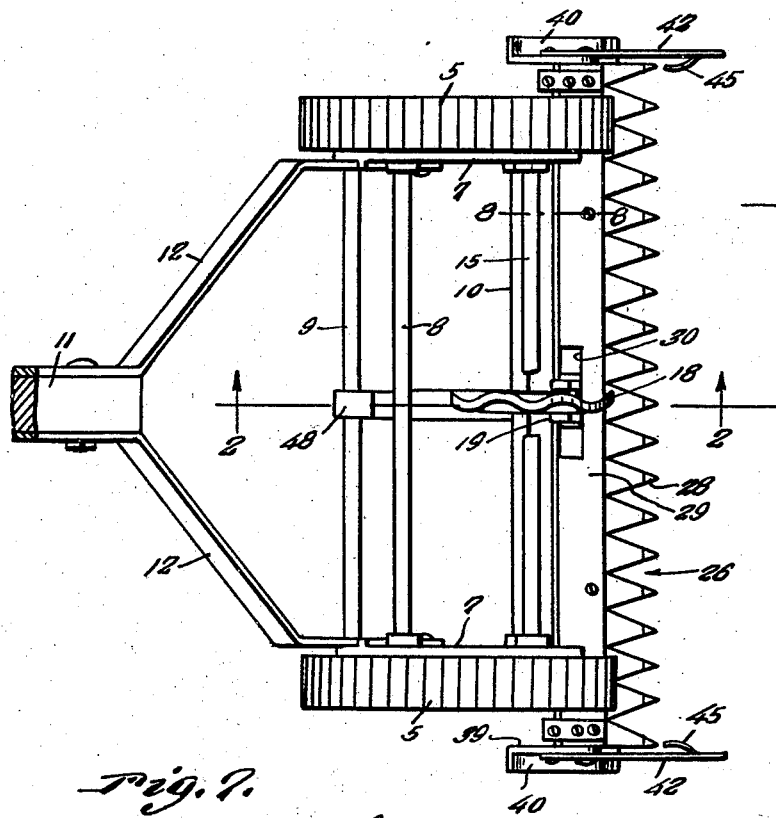
Figure 1 represents a top plan view.
Figure 7:
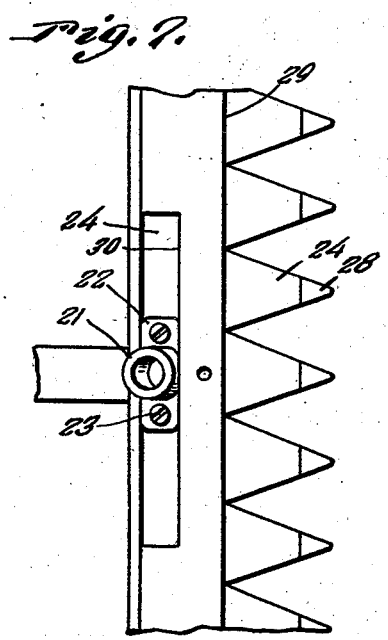
Figure 7 is a fragmentary top plan view of the sickle structure.
Figure 8:
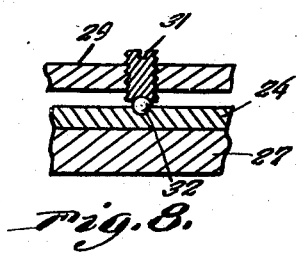
Figure 8 is a fragmentary detailed sectional view on the line 8—8 of Figure 1.
Figure 3:
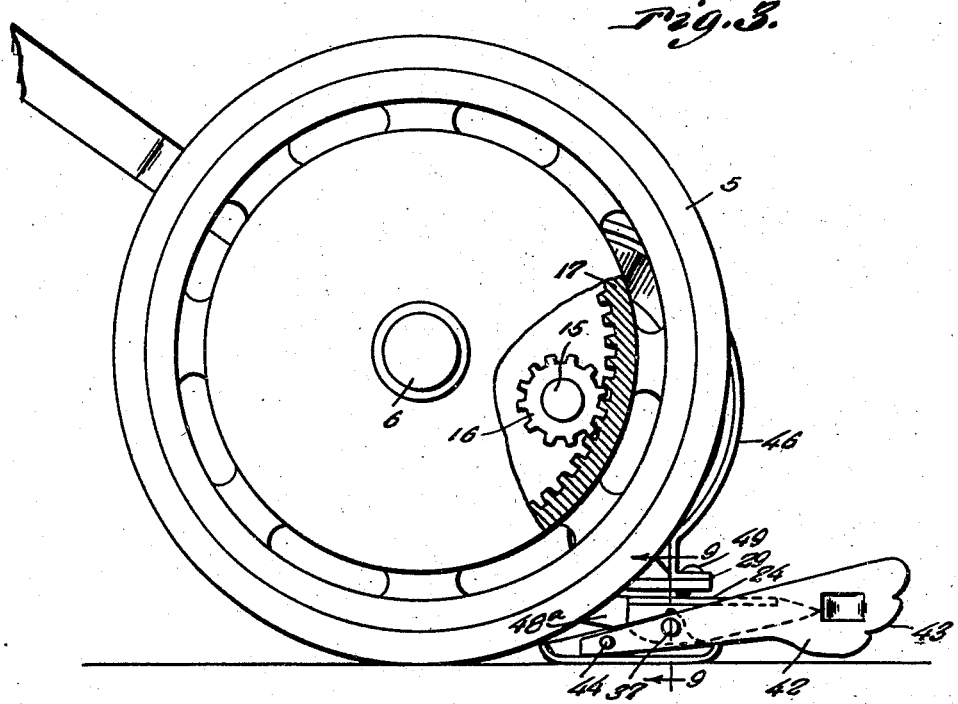
Figure 3 is an end elevational view of the mower with a portion in section.
Figure 4:
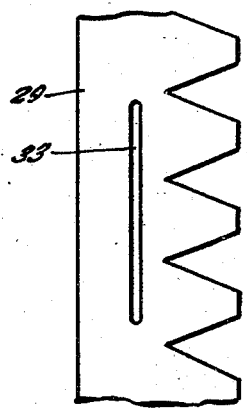
Figure 4 is a fragmentary top plan view of the sickle blade.
Figure 9:
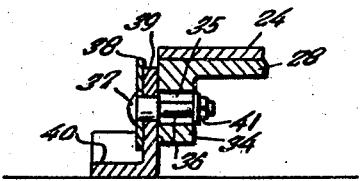
Figure 9 is a sectional view taken substantially on the line 9—9 of Figure 3.

Referring to the drawings wherein like numerals designate like parts, it can be seen that the mower consists of the round riding wheels 5—5 mounted on the stub shafts 6 which project downwardly from the frame plates 7—7. These frame plates 7—7 are braced by the tie rods, 8, 9 and 10.

Numeral 11 represents the handle bar from the lower end of which the brace legs 12—12 extend and passing between corresponding pairs of lugs 13 on the frame plates 7, are attached to the corresponding frame plates by suitable means 14.

In carrying out the present invention, a shaft 15 is horizontally disposed with its end portion disposed into the wheels 5 and there equipped with pinions 16. These pinions mesh with the internal ring gears 17 at the inner sides of the wheels 5. Thus the air 15 is in driven relation with the wheels 5—5. This shaft 15 carries a cam or fluted wheel 18, the peripheral portion of which rides within the confines of the upstanding arms a—a of the Y-shaped yoke 19, this yoke having the depending shank 20 which is rotatably disposed into the socket 21, the latter being secured by gears 22 and securing elements 23 to the sickle blade 24. The inner sides of the arms a—a of the yoke 19 are recessed to receive the ball bearings 25. These ball bearings ride against the opposite sides of the fluted wheel 18.

The sickle structure is generally referred to by numeral 26 and consists of the elongated guard bar 27 having the guard teeth 28 extending forwardly therefrom. Above the guard bar 27 is the top bar 29 which is slotted as at 30 so that the socket 21 can extend upwardly therethrough and be permitted to travel longitudinally of said bar 29.

A set screw 31 is feedable downwardly through each end portion of the bar 29, the lower end of the set screw being recessed to receive a ball bearing 32 which rides against the sickle blade 24, this ball 32 being seated in a longitudinally extending groove 33 of said sickle blade 29.

Each end of the guard bar 27 is provided with a depending ear 34 vertically slotted as at 35 and through this slotted portion of each ear 34 is disposed the reduced portion 36 of a bolt 37 which passes through the side cutter blade 38 and also through the upstanding flange 39 of the ground riding shoe 40. Obviously, by tightening the nuts 41 on the bolt 37 after predeterminately setting the shoes for proper spacing of the guard bar 27 from the ground, these shoes will ride the ground and maintain the sickle at the proper cutting elevation.

Rearwardly tapering blade structures 42, having their forward end portions somewhat feathered as at 43 are each sharpened on its forward end portion and on its lower edge portion for the purpose of cutting grass along walks or paths. A member 44 and the aforementioned bolt 37 serves to secure each blade 42 to the corresponding shoe 40.

It can now be seen, that rotation of the wheels 5 will drive the fluted wheel 18 in the fluted or waved edge portion of the wheel, in acting against the ball bearings 25—25 of the yoke 19 reciprocate the sickle blade and result in the necessary cutting operations. The blades 42 will serve to cut along walks and will define the path cut by the mower in general and the inwardly struck tongue portions 45 will serve to guide blades of grass and other growths into the space between the first adjacent pair of cutter guard teeth.

It can further be seen that numeral 46 represents a guard in the form of an elongated metallic strip which has one end secured as at 47 to the brace arm 48 for the guard bar 27, while the forward end of the guard 46 passes over the wheel 18 and then downwardly and is secured by a set screw 49 to the top bar 29 of the sickle assembly. Side arms 48a furnish additional supporting means for the bar 27.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A mower comprising a pair of drive wheels, a shaft disposed between the drive wheels and in driven relation with the drive wheels, a fluted wheel on the driven shaft, a sickle bar, said sickle bar being provided with an upstanding yoke adapted to straddle the edge portion of the said fluted wheel, said mower including a frame, brace bars between the end portions of the frame, said sickle bar including a guard bar, and an arm extending rearwardly from the guard bar and having its rear end swingably connected to one of the said brace bars.

2. A mower comprising a pair of wheels, a shaft interposed between the wheels and being in driven relation with the wheels, a fluted wheel carried by the driven shaft, a sickle structure disposed with its end portions terminating in front of the said wheels, said sickle structure including a sickle blade driven by the fluted wheel, and end cutter blades carried by the ends of the sickle structure, the ends of the said sickle structure being provided with vertically adjustable ground riding shoes, said end cutter blades being secured to the said shoes and adapted to project forwardly therefrom and provided with sharpened forward and bottom edges.

3. A mower comprising a pair of wheels, a shaft interposed between the wheels and being in driven relation with the wheels, a fluted wheel carried by the driven shaft, a sickle structure disposed with its end portions terminating in front of the said wheels, said sickle structure including a sickle blade driven by the fluted wheel, and end cutter blades carried by the ends of the sickle structure, the ends of the said sickle structure being provided with vertically adjustable ground riding shoes, and inwardly disposed deflectors on the cutter blades for deflecting adjacent blades of grass inwardly toward the sickle structure.

PIUS B. HUMPHREY.